(12) United States Patent
Brown et al.

(10) Patent No.: US 8,644,725 B2
(45) Date of Patent: Feb. 4, 2014

(54) MULTIPLE STIFFNESS SEAL FOR IMAGING COMPONENT SURFACES

(75) Inventors: Stephen Andrew Brown, Shelbyville, KY (US); Nicholas Fenley Gibson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 288 days.

(21) Appl. No.: 13/110,741

(22) Filed: May 18, 2011

(65) Prior Publication Data

US 2012/0292857 A1 Nov. 22, 2012

(51) Int. Cl.
*G03B 15/08* (2006.01)

(52) U.S. Cl.
USPC .......................................................... 399/102

(58) Field of Classification Search
USPC .................................................. 399/102, 105
See application file for complete search history.

(56) References Cited

U.S. PATENT DOCUMENTS

| | | |
|---|---|---|
| 3,809,012 A | 5/1974 | Delvecchio |
| 3,985,436 A | 10/1976 | Tanaka et al. |
| 4,218,131 A | 8/1980 | Ito et al. |
| 4,400,082 A | 8/1983 | Kiba |
| 4,498,760 A | 2/1985 | Sugiyama |
| 4,500,195 A | 2/1985 | Hosono |
| 4,540,268 A | 9/1985 | Toyono et al. |
| 4,564,283 A | 1/1986 | Fox et al. |
| 4,616,919 A | 10/1986 | Adley et al. |
| 4,627,701 A | 12/1986 | Onoda et al. |
| 4,681,426 A | 7/1987 | Bean et al. |
| 4,779,119 A | 10/1988 | Kaieda |
| 4,791,454 A | 12/1988 | Takahashi et al. |
| 4,802,928 A | 2/1989 | Dunlap |
| 4,819,030 A | 4/1989 | Shibano |
| 4,862,209 A | 8/1989 | Sakamoto et al. |
| 4,870,449 A | 9/1989 | Brown |
| 4,893,151 A | 1/1990 | Yamazaki |
| 4,905,047 A | 2/1990 | Ariyama |
| 4,937,632 A | 6/1990 | Kamidaira |
| 4,947,216 A | 8/1990 | Surti |
| 5,021,830 A | 6/1991 | Koiso |
| 5,029,316 A | 7/1991 | Koiso |
| 5,202,729 A | 4/1993 | Miyamoto et al. |
| RE34,384 E | 9/1993 | Ishiguro et al. |
| 5,321,473 A | 6/1994 | Azami |
| 5,369,477 A | 11/1994 | Foote et al. |
| 5,404,216 A | 4/1995 | Numagami et al. |

(Continued)

OTHER PUBLICATIONS

International Search Report and Written Opinion dated Aug. 17, 2012 for PCT Application No. PCT/US12/38086.

(Continued)

*Primary Examiner* — Walter L Lindsay, Jr.
*Assistant Examiner* — Frederick Wenderoth
(74) *Attorney, Agent, or Firm* — Justin M Tromp; John Victor Pezdek

(57) ABSTRACT

An end seal for use in an image forming apparatus that provides increased contact pressure using projecting ribs at nip locations formed between an end of a roll and the ends of other components such as a doctor blade or flap seal and lower contact pressure along the end of the roll. Contact pressure may be varied by changing the thickness along portions of the projecting ribs or the use of transverse ribs between each of the projecting ribs and a second surface of the end seal.

27 Claims, 6 Drawing Sheets

(56) References Cited

U.S. PATENT DOCUMENTS

| | | |
|---|---|---|
| 5,455,665 A | 10/1995 | Baba et al. |
| 5,475,467 A | 12/1995 | Watanabe et al. |
| 5,488,462 A | 1/1996 | Ishikawa et al. |
| 5,502,547 A | 3/1996 | Shirai |
| 5,550,617 A | 8/1996 | Odagawa et al. |
| 5,585,895 A | 12/1996 | Yashiro et al. |
| 5,655,178 A | 8/1997 | Ishikawa et al. |
| 5,697,021 A | 12/1997 | Watanabe et al. |
| 5,697,022 A | 12/1997 | Matsuda et al. |
| 5,701,558 A | 12/1997 | Kojima |
| 5,758,230 A | 5/1998 | Nakaue et al. |
| 5,774,765 A | 6/1998 | Hirota et al. |
| 5,778,282 A | 7/1998 | Nagashima |
| 5,805,958 A | 9/1998 | Fisk |
| 5,805,965 A | 9/1998 | Tsuda et al. |
| 5,809,374 A | 9/1998 | Tsuda et al. |
| 5,870,651 A | 2/1999 | Shimada |
| 5,895,144 A | 4/1999 | Nishimura |
| 5,895,151 A | 4/1999 | Kinoshita et al. |
| 5,937,237 A | 8/1999 | Nonaka et al. |
| 5,946,530 A | 8/1999 | Tsuji et al. |
| 5,987,277 A | 11/1999 | Okabe |
| 5,995,774 A | 11/1999 | Applegate et al. |
| 6,009,285 A | 12/1999 | Barry et al. |
| 6,035,158 A | 3/2000 | Asakura et al. |
| 6,049,689 A | 4/2000 | Ishii et al. |
| 6,071,660 A | 6/2000 | Black et al. |
| 6,078,763 A | 6/2000 | Hoshi |
| 6,094,550 A | 7/2000 | Kido et al. |
| 6,115,565 A | 9/2000 | Noda |
| 6,178,301 B1 | 1/2001 | Kojima et al. |
| 6,181,897 B1 | 1/2001 | Kawai |
| 6,185,392 B1 | 2/2001 | Hoshi |
| 6,195,515 B1 | 2/2001 | Fujita et al. |
| 6,205,304 B1 | 3/2001 | Kawaguchi |
| 6,212,343 B1 | 4/2001 | Hosokawa et al. |
| 6,341,206 B1 | 1/2002 | Yamaguchi et al. |
| 6,487,383 B2 | 11/2002 | Buchanan et al. |
| 6,553,195 B2 | 4/2003 | Korfhage et al. |
| 6,643,481 B2 | 11/2003 | Higeta et al. |
| 6,690,900 B2 | 2/2004 | Dougherty et al. |
| 6,792,856 B2 | 9/2004 | Hall et al. |
| 6,842,595 B1 | 1/2005 | McIver et al. |
| 7,561,820 B2 | 7/2009 | Gayne et al. |
| 7,623,807 B2 * | 11/2009 | Carter et al. .................. 399/102 |
| 7,627,265 B2 * | 12/2009 | Gayne et al. .................. 399/103 |
| 8,099,012 B2 | 1/2012 | Askren et al. |
| 8,116,657 B2 | 2/2012 | Kant et al. |
| 2007/0034100 A1 | 2/2007 | Gayne et al. |

OTHER PUBLICATIONS

Voltaire. "Ink Film Splitting Acoustics in Offset Printing" (online). Dated 2006. Retrieved by the PCT International Searching Authority on Jul. 31, 2012 from the Internet at URL: <http://kth.diva-portal.org/smash/get/diva2:9805/FULLTEXT01>.

* cited by examiner

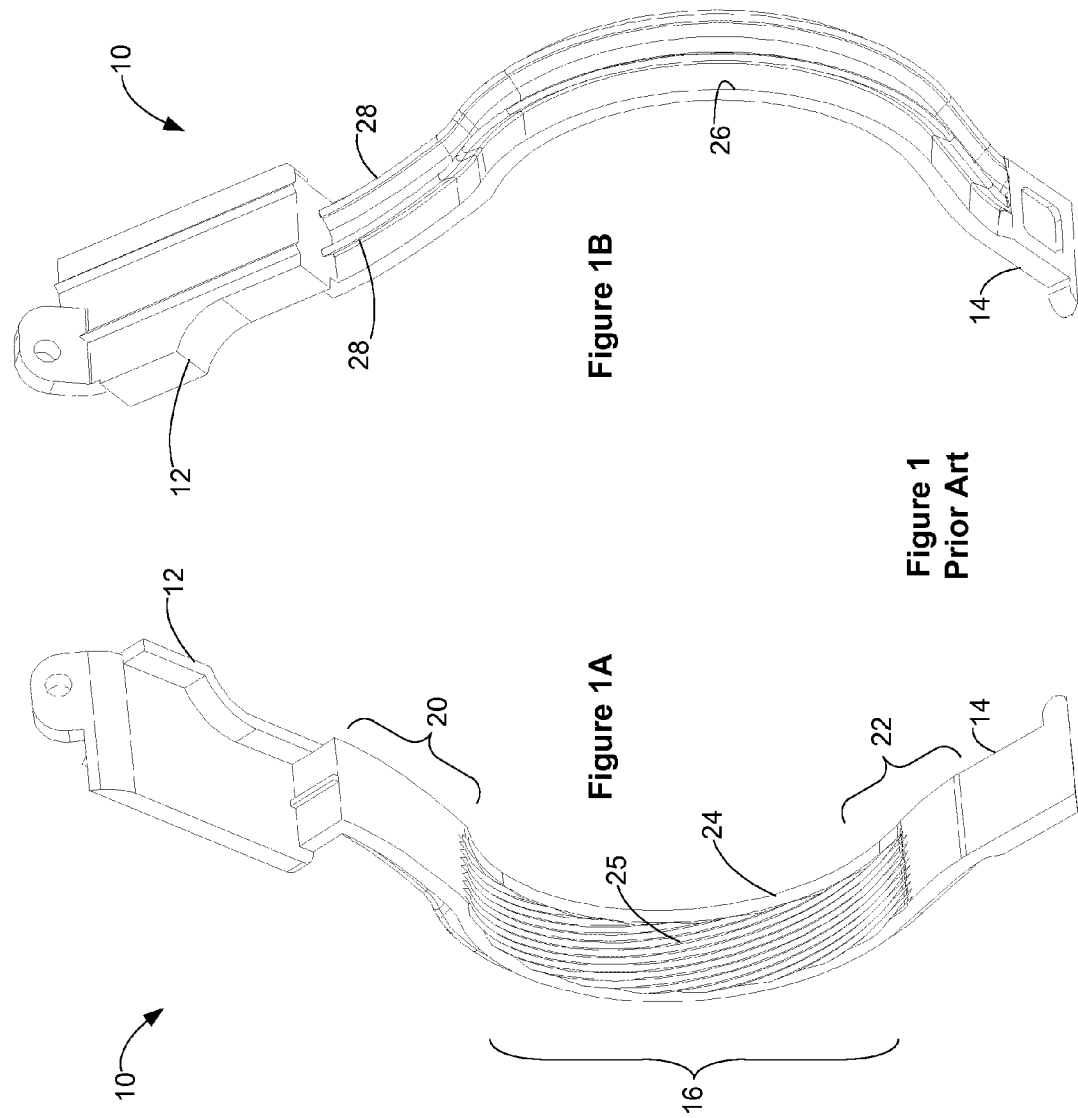

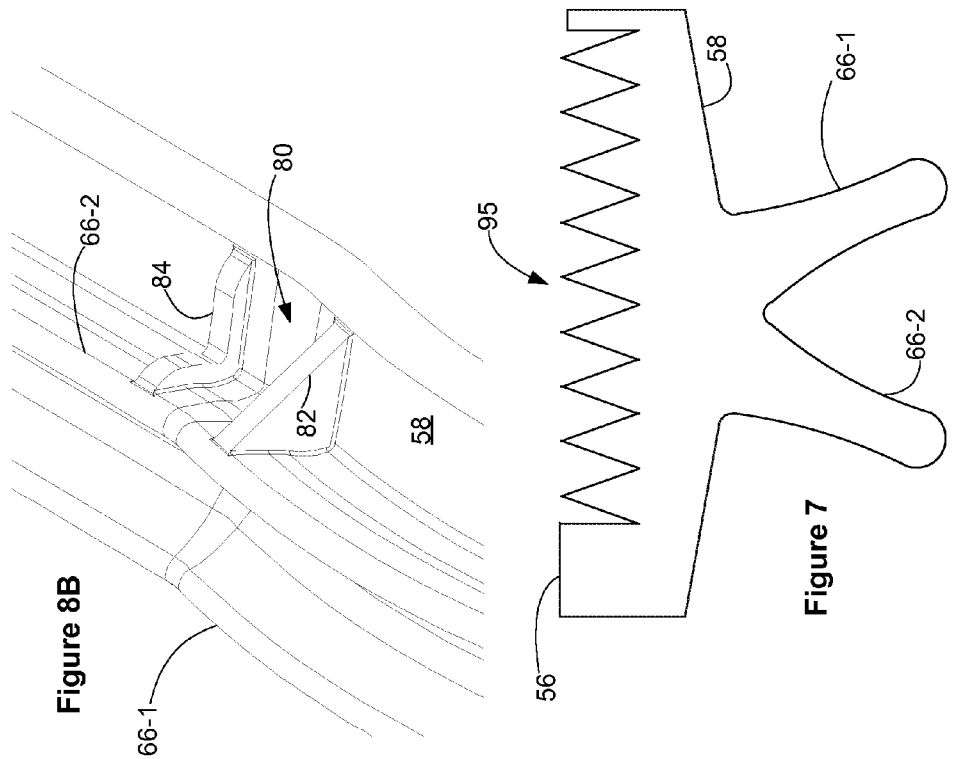
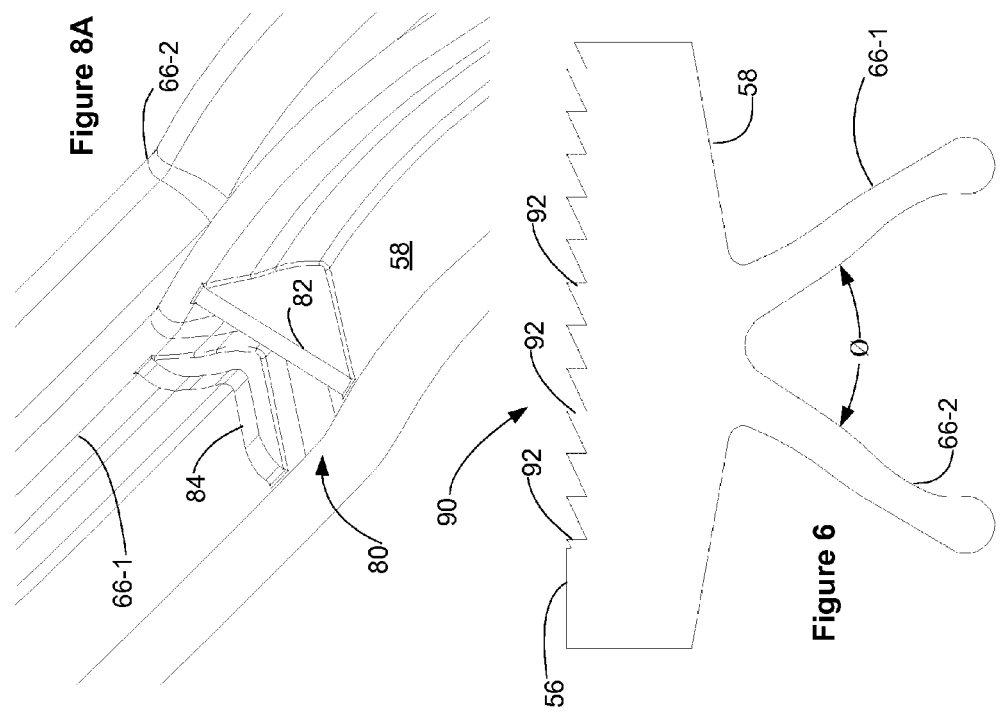

MULTIPLE STIFFNESS SEAL FOR IMAGING COMPONENT SURFACES

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates to seals which may be used in an image forming apparatus. The seals may prevent the leakage of image forming materials, e.g., as between components and a housing in the image forming device. The image forming apparatus may include an electrophotographic device, ink printer, copier, fax, all-in-one device or multi-functional device.

2. Description of the Related Art

An image forming device, such as an electrophotographic device, ink printer, copier, fax, all-in-one device or multi-functional device may use developing agents such as toner or ink, which are stored in a cartridge and may be disposed on media to form an image. The developing agent, such as toner, may be fixed to the media using an image fixing apparatus, which may apply heat and/or pressure to the toner. Leakage of the toner from the cartridge may occur as it may be difficult to seal gaps between a rotating roll, a cleaning or doctor blade and the housing of the cartridge. Seals may be provided to effectively close the gaps and prevent toner leakage. Positioning of the roll against the seal and tolerance stack-up of the various mating components may create uneven stress and a non-uniform temperature profile. At higher printing speeds, heat may be generated due to the compression of the seal against the rotating roll causing the toner to melt. Design of the seal may therefore be an important factor in cartridge life.

Shown in FIGS. 1, 1A and 1B is a prior art seal 10. Seal 10 comprises a head 12, a toe 14, a rotary seal portion 16, a blade seal portion 20, a flap seal portion 22. A sealing surface 24 has a plurality of angled grooves 25 within the rotary seal portion 16. Blade seal portion 20 effects a seal between a doctor blade, a developer roll and a nip therebetween. Flap seal portion 22 effects a seal between a developer roll, a flap seal that runs along the length of the developer roll and a nip therebetween. To seal the two nips, projecting ribs 28 are provided on biasing surface 26. A feature of the ribs 28 is that they provide a uniform compressive force along their length. This is an effective design in systems having print speeds of 30 to 50 ppm (pages per minute) and lower. The seal 10 is designed to have sufficient compressive force to seal the two nips which requires a higher force than for example the force needed to seal along the developer roll within the rotary seal section 16. As printing speeds increase to even higher rates, for example 70-100 ppm, such a design using uniform compressive force produces unwanted frictional forces and heat along the rotary seal portion 16 of the seal 10. This unwanted heat may cause banding of the developer roll, or melting or agglomeration of the toner within an imaging apparatus leading to print defects. It would be advantageous to have a seal having areas of higher compressive force where needed such as at the nip locations and areas of lower compressive force where it is not required to provide an effective seal.

SUMMARY

A sealing member for sealing between a roll and at least one printer component, comprises a first surface to be engaged with the roll and the at least one printer component, the roll and the at least one printer component forming a nip region therebetween, the first surface including at least one groove, a first portion of the first surface engaging with a corresponding portion of the roll at a first contact pressure and a nip region portion of the first surface abutting an end of the first portion of the first surface and engaging the roll and the at least one printer component along said nip region at a second contact pressure; and a second surface biasing the first surface to engage with the roll and the at least one printer component, a first portion of the second surface providing the first contact pressure in a substantially uniform manner along the first portion of the first surface, and a nip region portion of the second surface providing the second contact pressure along the nip region portion of the first surface that is greater than the first contact pressure. Various pressure profiles along the length of the sealing member can be achieved. The second contact pressure may be 1.5 to 5 times as great as the first contact pressure.

The second surface may include a pair of projecting ribs which define an angle between said projecting ribs of about 1 to 179 degrees with each rib having a first stiffness along the first portion of the second surface to provide the first contact pressure and a second stiffness along the nip region portion of the second surface that is greater than the first stiffness to provide the second contact pressure. The stiffness of the projecting ribs at the various portions along the seal may be varied up or down by altering the cross-sectional of the ribs by thickening or thinning. Also transverse ribs extending between each rib and the second surface may be used to increase stiffness and hence contact pressure. The first surface of the seal member may contain a plurality of grooves having different orientations along portions of the seal surface.

BRIEF DESCRIPTION OF THE DRAWINGS

The detailed description below may be better understood with reference to the accompanying figures which are provided for illustrative purposes and are not to be considered as limiting any aspect of the invention.

FIG. 1 is an illustration of a prior art seal showing in FIG. 1A the sealing surface and in FIG. 1B the biasing surface.

FIG. 6 is a section view taken along line 6-6 of FIG. 5 showing a first stiffness section in a rotary seal portion.

FIG. 7 is a section view taken along line 7-7 of FIG. 5 showing a second stiffness section in a nip region.

FIGS. 8A and 8B illustrate the use of two versions of transverse stiffening ribs for use in the exemplary seal.

DETAILED DESCRIPTION

The present disclosure relates to end seals which may be used between component surfaces, such as component surfaces in an image forming apparatus. The end seals may prevent the leakage of toner, e.g. as between a blade and a housing, between a roll and a flap seal, or between a roll and a frame in the image forming apparatus. The blade may be a "doctor blade" which controls the thickness of image forming material on a given surface, such as a roll surface. The roll may specifically include a developer roll which supplies toner to a photosensitive drum. The end seals may also prevent the leakage of toner between the developer roll and a flap seal that also extend along the length of the developer roll. In particular, the end seals may prevent leakage at the nip between the roll and abutting devices such as the doctor blade or the nip between the roll and the flap seal by providing increased compressive forces within a region about the nip locations.

Figure 3:
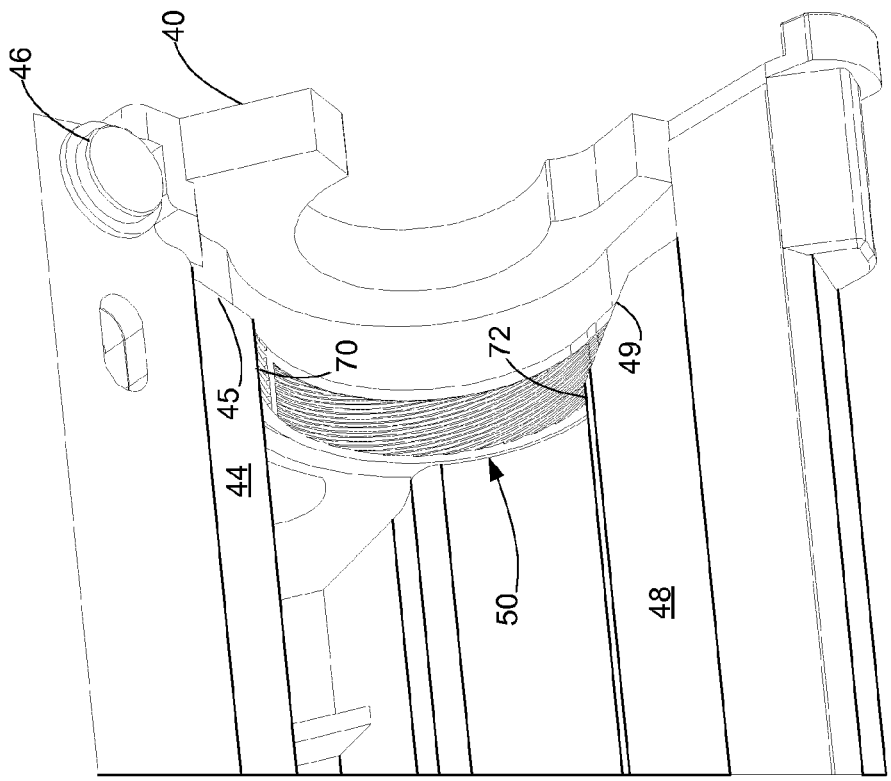
FIG. 3 is the view of FIG. 2 with the developer roll removed from the frame to expose the exemplary seal.
Figure 2:
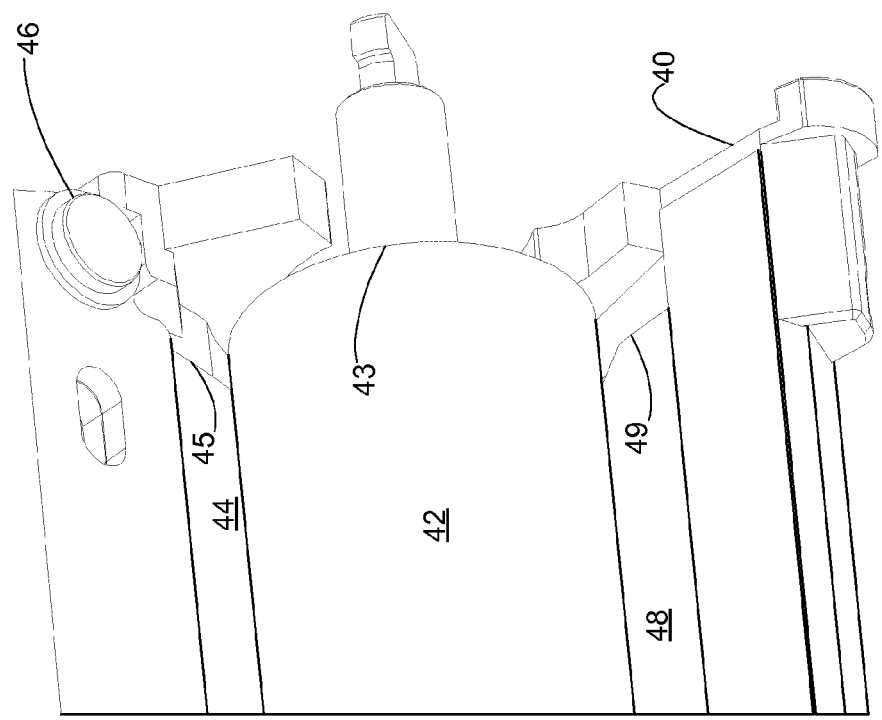
FIG. 2 is a view of an exemplary seal (hidden) in an exemplary frame with a developer roll installed.
Figure 4:
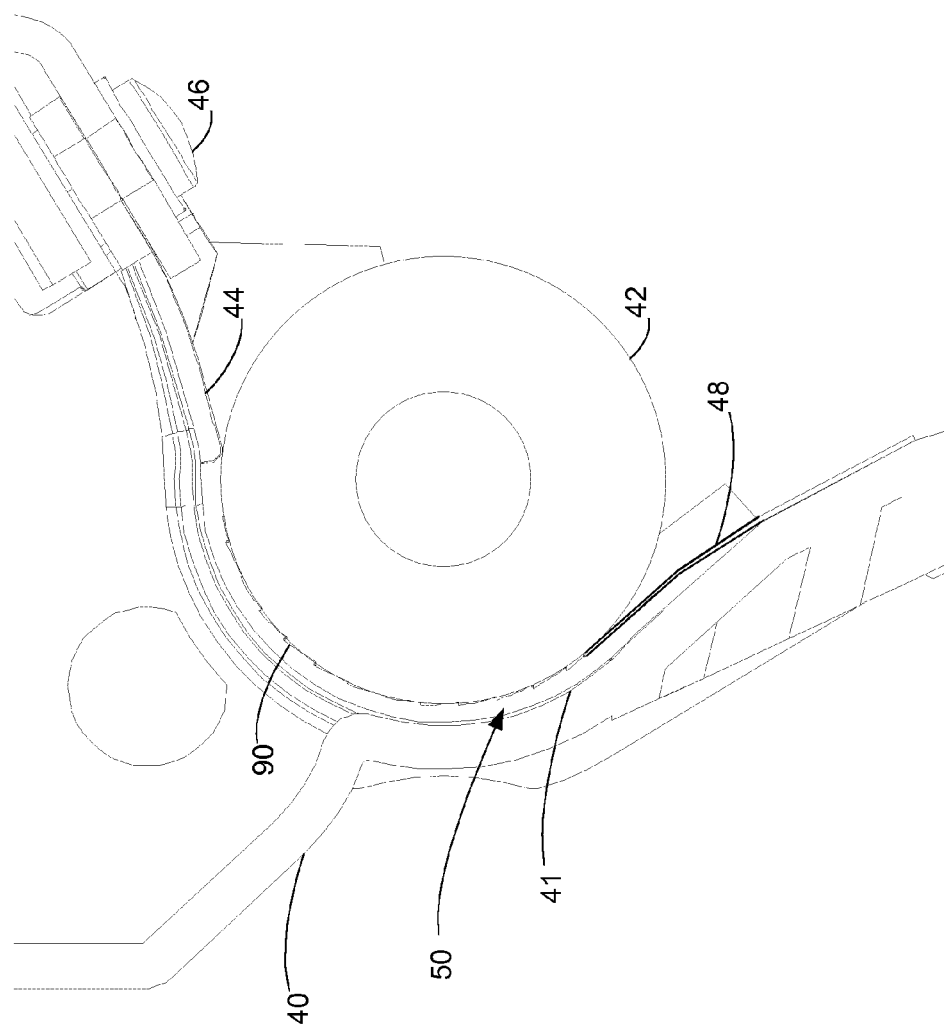
FIG. 4 is an end view of the exemplary seal, developer roll, doctor blade and flap seal within a frame.

With reference first to FIGS. 2-4, an exemplary end seal 50 is illustrated that may be disposed in the frame 40. Frame 40 may be in a toner cartridge of an image forming apparatus or within a developer unit contained within an image forming apparatus. The end seal 50 may be compressed between a mating surface 41 (see FIG. 4) formed at each end in the frame 40 to contain end seal 50 and an end portion 45 of a developer roll 42, an end portion 45 doctor blade 44, and an end portion 49 of a flap seal 48. It will be realized that a mirror image seal is provided at the other ends of these components that are mounted on frame 40. FIG. 2 is a front view showing placement of the exemplary developer roll 42, a doctor blade 44 and a flap seal 48 within frame 40. Doctor blade 44 is illustrated as being affixed to frame 40 using several screws 46 provided along the length of doctor blade 44. Other forms of attaching doctor blade 44 to the frame 40 may also be used. Flap seal 48 is a generally rectangular seal made of a polyester film such as MYLAR™ or similar material, is approximately 0.1 mm thick, and is used to prevent toner from leaking along the line of the nip between developer roll 42 and frame 40. Pegs (not shown) may be provided on frame 40 intermediate the ends of flap seal 48 which align with corresponding openings in flap seal 48 to aid in retaining flap seal 48 in place along the length of developer roll 42. In addition to or in lieu of the pegs, an adhesive may be used to affix flap seal 48 to frame 40 to seal a potential leak path for toner between flap seal 48 and frame 40.

FIG. 3 is a view of FIG. 2 with developer roll 42 removed so that end seal 50 may be seen more clearly mounted on mating surface 41 along with its position in relation to the end 45 of doctor blade 44 and the end 49 of flap seal 48. FIG. 4 is a side view of exemplary end seal 50 mounted the frame 40, as well as developer roll 42, doctor blade 44, and flap seal 48. In addition, a plurality of grooves 90 whose function are described herein are also seen in this figure.

The interference of the developer roll 42, doctor blade 44 and flap seal 48 to the end seal 50 may be determined by the positions of the roll 42, doctor blade 44 and flap seal 48, respectively. Depending on the amount of interference, which may be due primarily to the positioning and/or to the tolerance stack-up of various components, higher speeds of printing may result in high temperatures and melting of the toner. This build-up of heat may be further exacerbated by the composition of the roll surface and end seal, both often made of relatively soft elastomers. Melted toner may then wedge between the doctor blade 44 and developer roll 42 or between the developer roll 42 and flap seal 48 which may lead to printer malfunction or failure.

Figure 5:
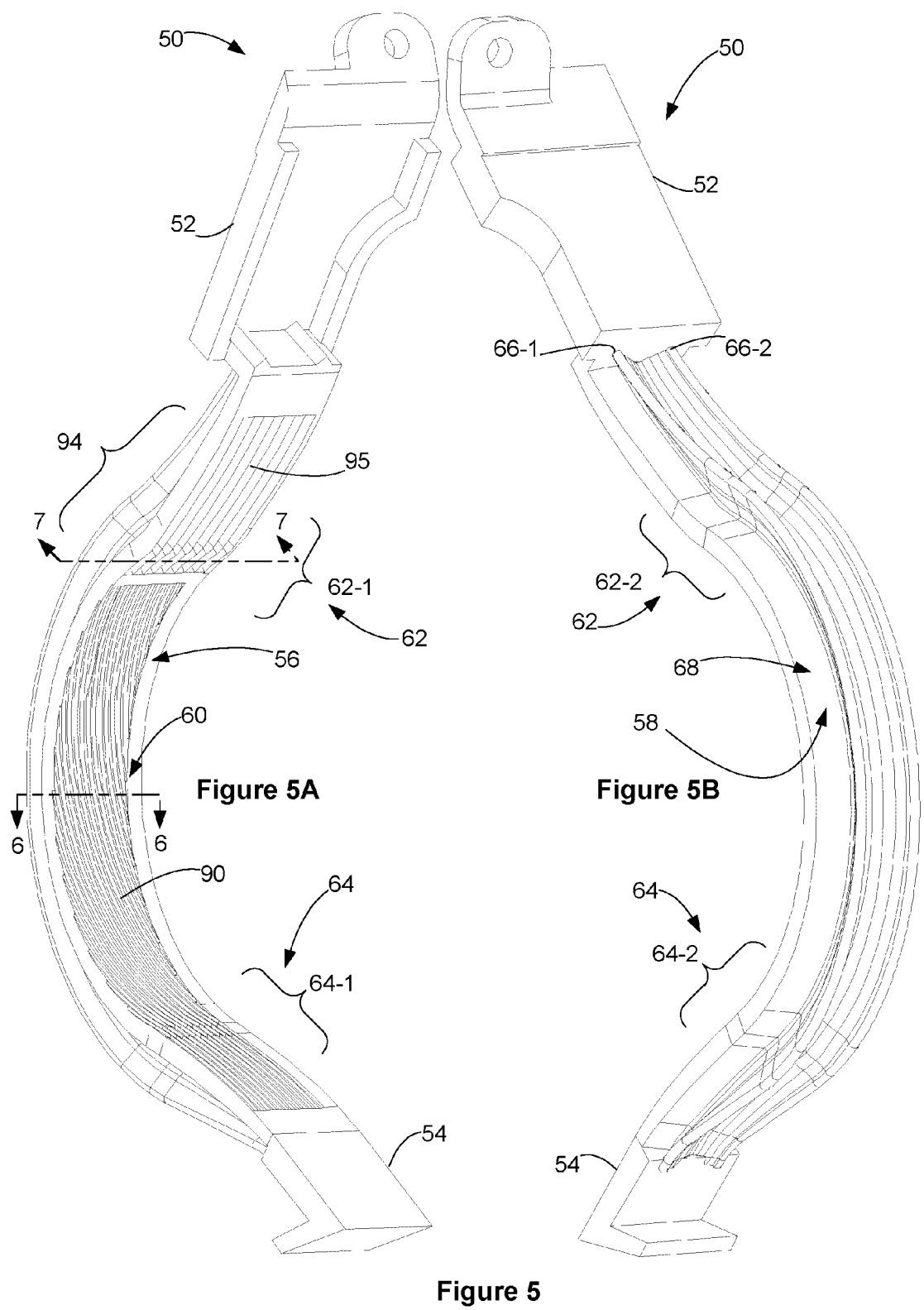
FIG. 5 is an illustration of the exemplary seal showing in FIG. 5A the sealing surface and in FIG. 5B the biasing surface.

FIG. 5 is a more detailed illustration of the exemplary end seal 50. At respective ends of the illustrated end seal 50 is a head 52 and a toe 54. The head 52, that will be positioned between the end 45 of doctor blade 44 and frame 40, and the toe 54 are used to position end seal 50 along mating surface 41 in frame 40 and along the ends 43, 45, and 49 of developer roll 42, doctor blade 44, and flap seal 48, respectively. A first surface 56, also referred to as a sealing surface 56, and a second surface 58, also referred to as a biasing surface 58, interconnect head 52 and toe 54. Sealing surface 56 may have at least one groove or a plurality of grooves extending along its length. A first portion 60 of sealing surface 56, also referred to as a rotary seal portion 60, engages with and seals a corresponding portion of the end 43 of developer roll 42 at a first contact pressure. Sealing surface 56 further includes a nip region portion abutting one end of the first portion 60, e.g. one end of rotary seal portion 60, that corresponds to the nip region formed between the end 43 of developer roll 42 and the end 45 of doctor blade 44 or between the developer roll and the end 49 of flap seal 48. As illustrated in FIG. 5, two nip region portions 62, 64 are shown. Nip region portion 62 corresponds to the nip region of the end 43 of developer roll 42 and the end 45 of doctor blade 44 while nip region portion 64 corresponds to the nip region of the end 43 of developer roll 42 and the end 49 of flap seal 48. Nip region portion 62-1 refers to the nip region portion 62 that is on the first or sealing surface 56, while nip region portion 62-2 refers to the nip region portion 62 on the second surface or biasing surface 58; similarly for nip region portions 64-1 and 64-2 of nip region portion 64. Where only one component is provided in contact with developer roll 43, only one nip region portion would be provided within end seal 50. As described herein, the contact pressures in the nip region portions 62, 64, that is a second contact pressure and or a third contact pressure, are greater than the first contact pressure occurring along the first portion 60 of sealing surface 56. The second and third contact pressures may be equal or may be different, but each are greater than the first contact pressure.

The second or biasing surface 58, is used to provide the first contact pressure within a first portion 68 of the second surface 58 corresponding to the first portion 60 of the first surface and the second and third contact pressures in the nip region portions 62, 64. Provided along second surface 58 is a pair of projecting ribs 66-1, 66-2. When end seal 50 is inserted into frame 40, the projecting ribs 66-1, 66-2 act to compress sealing surface 56 against the developer roll 42 and the ends 45, 49 of the other printer components, doctor blade 44 and flap seal 48. Various embodiments as discussed herein may be used to achieve the first contact pressure and the second and third contact pressures.

Shown in FIGS. 6 and 7 are two sectional views of end seal 50 taken along lines 6-6 and 7-7 shown in FIG. 5A. FIG. 6 shows a section view through the first portion 60 of the first surface 56 and a first portion 68 of the second surface 58. FIG. 7 shows a section through the nip region portion 62 of the end seal 50. As illustrated in FIG. 7, the section of the ribs 66-1 and 66-2 along the second surface or biasing surface 58 is thicker than the section of the ribs 66-1, 66-2 in first portion 68 of the second surface 58 shown in FIG. 6. Accordingly, the portions of the ribs 66-1, 66-2 within nip region portion 62-2 on the second surface 58 are stiffer than the portions of the ribs 66-1, 66-2 within the first portion 68 of the second surface 58. Because the portions of the ribs 66-1, 66-2 within nip region portion 62-2 on the second surface 58 is stiffer, they exert a greater contact pressure within the nip region portion 62. The portions of ribs 66-1, 66-2 within nip region portion 64-2 are made stiffer in a similar fashion than the portions of the ribs 66-1, 66-2 within the first portion 68 of the second surface 58. The shape and stiffness of the ribs in each of the nip regions 62, 64 is dependent on the contact pressure or force needed to seal the nip 70 between the end 45 of doctor blade 44 and the end 43 of developer roll 42 or at the nip 72 between the end 49 of flap seal 48 and the end 43 of developer roll 42. The transition in the shape of ribs 66-1, 66-2 from the first portion 68 of the second surface 58 into nip regions 62-2, 64-2 may be a continuous and smooth transition or may be a discontinuous transition by having the ribs step outwardly to broaden them.

The ribs 66-1, 66-2 may define an angle Ø which may have a value of between about 1 to 179 degrees, including all values and increments therebetween. For example, Ø may have a value of between about 30 to 160 degrees. In addition, in the exemplary illustration, the ribs 66-1, 66-2 may be positioned such that they do not converge toward one another when projecting from the second surface 58 of the end seal 50.

Shown in FIGS. 8A and 8B, are alternate embodiments for providing greater contact pressure or higher stiffness in nip regions 62, 64 than along the first portions 60, 68 of first and second surfaces 56, 58, respectively. Shown are transverse ribs, generally indicated at 80, that interconnect the side of each of ribs 66-1, 66-2 to second surface 58, thereby providing localized increased stiffness. The transverse ribs 80 are used to increase the stiffness of ribs 66-1, 66-2 within the nip region portions 62, 64. A transverse rib 80 may be aligned with each of nips 70, 72 or may be placed on each side of where the nips 70, 72 are located, or at other locations within the nip region portions 62-2, 64-2 or elsewhere along the end seal 50 to achieve the desired contact pressure profile across the nip regions 62, 64 or elsewhere along the end seal. Of course, the desired contact pressure profile across the nip region portions 62, 64 may also be achieved by varying the cross section of the ribs 66-1, 66-2 or by a combination of varying rib cross section along with providing one or more transverse ribs.

Two illustrative forms of transverse rib 80 are shown although other shapes and designs may be used to achieve the same goal of increasing stiffness and hence contact pressures in the nip regions 62, 64 of the doctor blade 44 and flap seal 48, respectively, over the contact pressure applied to the developer roll end 43 within first portion 60. Transverse rib 82 is in the form of a gusset or triangle that interconnects the side of each of the ribs 66-1, 66-2 to the second surface 58. Transverse rib 84 is in the form of an L, having one leg along the side of each of the ribs 66-1, 66-2 and another leg connected to second surface 58. Transverse ribs 82, 84 are illustrated as being molded. Transverse ribs 82, 84 may be later added using adhesive in which case ribs 82, 84 may be formed of other materials as are known to one of skill in the art to achieve the desired stiffness and contact pressures.

The end seal 50 may comprise a molded (e.g., injection molded or compression molded) part made of a polymeric based elastomeric material. One suitable material is SANTOPRENE™, a thermoplastic vulcanizate, which provides performance similar to vulcanized rubber, such as flexibility (e.g., 35 Shore A to 50 Shore D including all increments and values therebetween). In addition, the end seal material may have relatively low compression set along with the processing capability of a thermoplastic resin. In addition, the material selected for the end seal 50 may provide continued sealing performance through heat and cold (−60° C. to 135° C.) along with resistance to fatigue, as well as oils, greases and a variety of acids and base compounds.

The first surface 56 may include what may be described as saw tooth type ribs forming grooves 90. Within the first portion or rotary seal portion 60, the grooves 90 may run at an angle to the process direction of the developer roll 42, at angles ranging from about 1 degree to about 45 degrees (preferably about 10 degrees) with respect to the sides of the end seal 50. The grooves 90 may therefore be arranged to move toner from the end 43 of the developer roll 42 toward the middle. By positioning the grooves in this way, they act to push toner away from the end 43 of the developer roll 42. The height of the ribs forming the grooves 90 generally may range from about 0.05 to about 0.5 mm, preferably about 0.1 mm, including all values and increments therein. The width of the ribs generally may range from about 0.01 to about 0.5 mm, preferably about 0.2 mm, also including all values and increments therein. As illustrated the groves 90 extend through nip region 64-1 but are redirected to be parallel to the sides of end seal 50. As can be seen in FIG. 3, the end 49 of flap seal 48 is tapered outwardly forming a tapered nip 72. Redirecting the grooves 90 within the nip region 64-1 to be parallel to the sides of the end seal 50 ensures that the tapered nip 72 intersects with the peaks of the grooves 90 ensuring that a seal is maintained along the tapered nip 72.

The end seal 50 also may also include a blade seal portion 94 for sealing the space formed between the frame 40 and the doctor blade 44. The blade seal portion 94 further includes a plurality of ribs 95 that are deeper and more widely spaced than grooves 90 and which are also parallel to the sides of end seal 50. FIG. 7 illustrates a section view of exemplary ribs 95. The height of the ribs 95 may range from about 0.2 mm to about 1.5 mm, preferably about 0.7 mm, including all values and increments therein. The width of the ribs may range from about 0.2 mm to about 1.0 mm, preferably about 0.5 mm, also including all values and increments therein. The ribs 95 may extend into the nip region portion 62-1. In prior art designs the blade seal portion 94 was generally a flat surface. The ribs 95 advantageously provide a multiplicity of sealing contacts with the end 45 of the doctor blade 44 that make it more difficult for a toner leak path to form across the width of the blade seal portion 94 between the blade seal portion 94 and the end 45 of the doctor blade 44 as compared to the flat surfaced blade seal portions of prior designs. Ribs 95 also act to increase the compliance of the blade seal portion 94.

It can now be appreciated that the end seal 50 may therefore provide a more optimized contact pressure distribution resulting in a lower temperature distribution than when a substantially uniform contact pressure is provided, particularly at relatively high printing speeds. Encroachment upon temperatures that would be sufficient to initiate melting or some level of flow of any one or more of the constituents of the toner (e.g., polymer resin, colorant, wax, inorganic salts) may be avoided.

Attention is directed to FIG. 6 where grooves 90 can be seen. The grooves may include one or a plurality of substantially vertical wall components 92 which may engage with a surface of the doctor blade 44 and/or developer roll 42. As illustrated, wall components 92 may form a substantially perpendicular angle when projecting the vertical wall component in a "y" direction and intersecting an "x" plane. The "x" plane may therefore be representative of a sealing surface. However, in the context of the present invention, the angle may be any angle greater than 45 degrees and less than 135 degrees, including all increments and values therebetween. For example, the angle may have a value of between 75-105 degrees, or may have a specific value of about 90 degrees. In addition, it has been found that such a wall design, when utilized in a image forming apparatus containing toner, and engaging a developer roller surface, may better serve to resist migration of toner between the grooves 90 away from the toner sump which thereby may further limit toner leakage.

Figure 9:
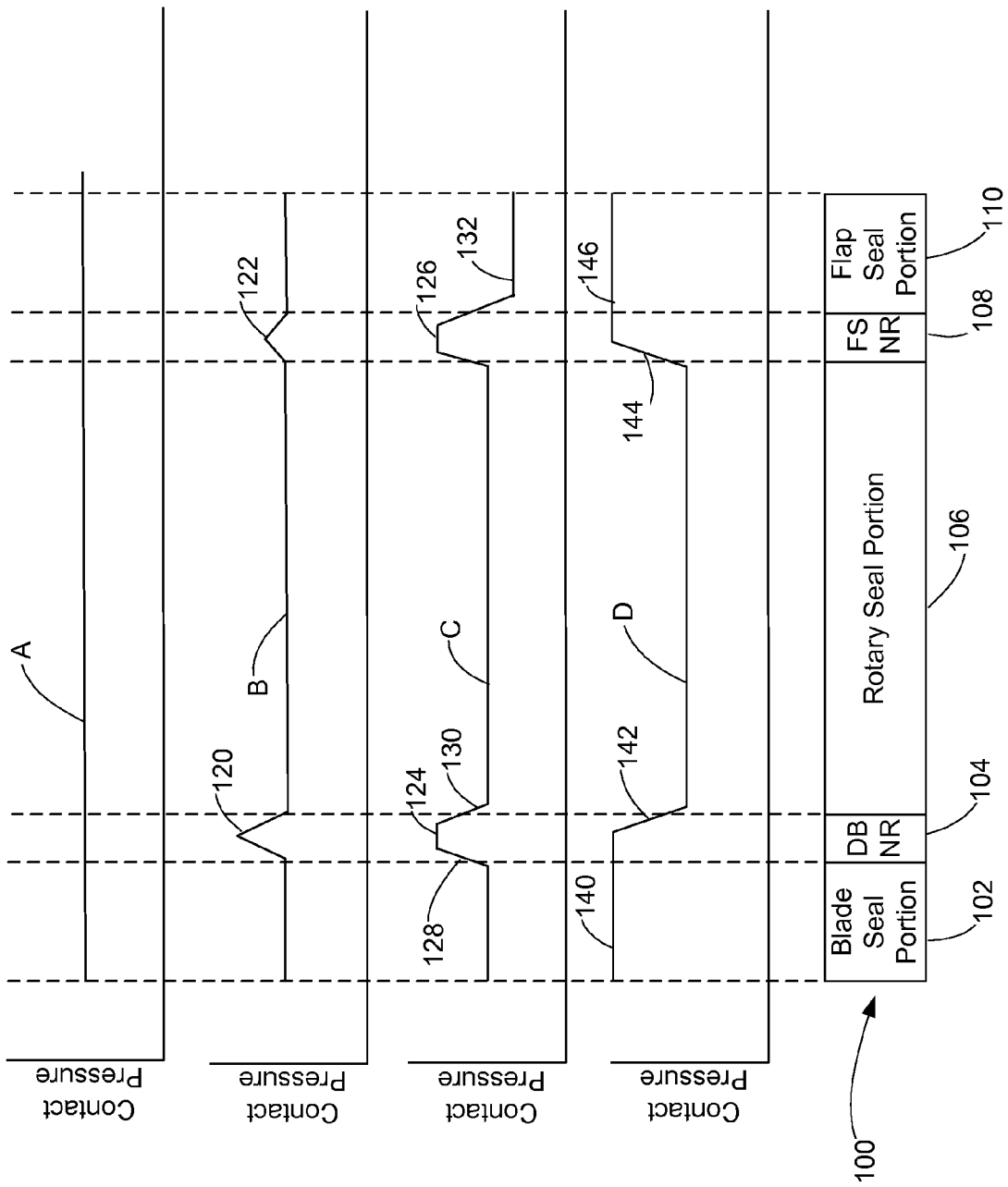
FIG. 9 illustrates a schematic representation of an end seal along with uniform and varied contact pressure profiles.

FIG. 9 illustrates relative contact pressure profiles provided by an end seal. A schematic representation of an end seal 100 is shown. End seal 100 comprises a doctor blade seal portion 102, a nip region 104 for a doctor blade, a rotary seal portion 106, a nip region 108 for a flap seal and a flap seal portion 110. Curves A, B, C and D represent relative contact pressure profiles across seal 100.

Curve A represents a substantially uniform contact pressure profile across the entirety of seal 100 as would be exhibited by prior art seal 10.

Curves B, C and D represent relative contact pressure profiles for embodiments of end seal 50 that illustrate the rib stiffening by increasing sectional dimensions within each of the two nip regions 104, 108, by use of one or more transverse stiffening ribs within nip regions 104, 108 of the exemplary end seal 50, or by the combination of increasing sectional dimensions and using transverse ribs.

Curve B shows a contact pressure peak at 120 and again at 122, which represents the respective nip locations 70, 72 between the doctor blade 44 and developer roll 42 and between the flap seal 48 and developer roll 42 of end seal 50. The contact pressure peak at 122 is illustrated as being less than that at 120. As illustrated, the increase in both contact pressures is shown as occurring within the nip regions 104, 108. One reason for the contact pressure peak 122 having a lower value is that the nip 72 between the flap seal 48 and developer roll 42 may be smaller and require less contact pressure to effect a seal.

Curve C shows a contact pressure plateau at 124 and again at 126, which spans across the respective nip locations 70, 72 between the doctor blade 44 and developer roll 42 and between the flap seal 48 and developer roll 42 of end seal 50. The pressure plateau at 126 is illustrated as being about equal to that at 124 which is a matter of design choice. As illustrated at 128, the increase in contact pressure in nip region 104 is shown as beginning within blade seal portion 102 a short distance from nip region 104. The contact pressure decreases at 130 and returns to a lower contact pressure within a short distance from rotary seal portion 106. A similar increase and decrease outside of the nip region 108 in rotary seal portion 106 and flap seal portion 110, respectively is again shown for contact pressure plateau 126. Also illustrated in Curve C at 132, is a reduction in the contact pressure of flap seal portion 110 that may be achieved by thinning ribs 66-1, 66-2.

Unlike Curves B and C where the contact pressure is reduced in the blade seal portion 102 and flap seal portion 110, Curve D illustrates, at 140, higher contact pressures across blade seal portion 102 and nip region portion 104 and across flap seal nip region 108 and flap seal portion 110 that each respectively decrease at 142, 144, to a lower contact pressure in the rotary seal portion 106. While the contact pressure profiles across blade seal portion 102, rotary seal portion 106 in Curves B, C and D are as illustrated as being relatively the same magnitude, these contact pressure profiles in these portions of the end seal 50 may be different from each other by stiffening or thinning the ribs 66-1, 66-2 to achieve the desired contact pressures and contact pressure profile. Contact pressures with the nip regions 104, 108, as well as blade seal portion 102 and flap seal portion 110, may be between 1.5 to 5 times, and preferably 2 times, the magnitude of the contact pressure in rotary seal portion 106. For example, the contact pressure along rotary seal portion 106 has been calculated to be in the range of about 0.0031 MPa to about 0.053 MPa while the contact pressure in nip regions 104, 108, and or as blade seal portion 102 and flap seal portion 110, has been calculated to be in a corresponding range of 0.0049 MPa to about 0.22 MPa. The contact pressures have been estimated using finite element analysis because the small size of the seal when mounted in its mating surface makes its unwieldy and difficult to perform actual contact pressure measurements.

By application of the principles described herein, various combinations of pressure profiles within or across the multiple portions of the end seal 50 may be achieved to accommodate a wide variety of designs in doctor blades, developer rolls, and or flap seals.

Although the end seal 50 has been illustrated using the specific embodiments described herein, the end seal 50 is intended to encompass seals as broadly described herein, including all equivalent structures of those specifically described in the present application. However, it should be apparent that changes and modifications may be resorted to without departing from the spirit and scope of the invention.

What is claimed is:

1. A sealing member for sealing between a roll and at least one printer component, comprising:
    a first surface to be engaged with the roll and the at least one printer component, the roll and the at least one printer component forming a nip region therebetween, the first surface including at least one groove, a first portion of the first surface engaging with a corresponding portion of the roll at a first contact pressure and a nip region portion of the first surface abutting an end of the first portion of the first surface and engaging the roll and the at least one printer component along said nip region at a second contact pressure; and
    a second surface biasing the first surface to engage with the roll and the at least one printer component, a first portion of the second surface providing the first contact pressure in a substantially uniform manner along the first portion of the first surface, and a nip region portion of the second surface providing the second contact pressure along the nip region portion of the first surface that is greater than the first contact pressure,
    wherein the second surface includes a pair of projecting ribs, each rib having a first stiffness along the first portion of the second surface to provide the first contact pressure and a second stiffness along the nip region portion of the second surface that is greater than the first stiffness to provide the second contact pressure.

2. The sealing member of claim 1, wherein a portion of each rib along the first portion of the second surface has a cross-sectional area that is less than the cross sectional area of a portion of each rib along the nip region portion of the second surface.

3. The sealing member of claim 2, wherein the cross sectional area of each rib in the nip region portion is greatest about a nip formed between the roll and the at least one printer component within the nip region.

4. The sealing member of claim 3, wherein the cross sectional area of each rib within the nip region portion of the second surface gradually increases in size from the abutment of the nip region portion of the second surface with the first portion of the second surface to a maximum size at about the nip.

5. The sealing member of claim 1, further comprising at least one transverse rib within the nip region portion of the second surface interconnecting one of said projecting ribs with the second surface.

6. The sealing member of claim 5, wherein the at least one transverse rib comprises two transverse ribs spaced apart on opposite sides of the nip, each of the two transverse ribs interconnecting said one of said projecting ribs with the second surface.

7. The sealing member of claim 1, wherein:
the first surface is further to be engaged with the roll and a second printer component, the roll and the second printer component forming a second nip region therebetween, a second nip region portion of said first surface abutting a second end of the first portion of the first surface and engaging the roll and the second printer component along the second nip region at a third contact pressure; and
the second surface further biasing the first surface to engage with the roll and the second printer component, a second nip region portion of the second surface providing the third contact pressure along the second nip region portion of the first surface that is greater than the first contact pressure.

8. The sealing member of claim 7, wherein each rib further having a third stiffness along the second nip region portion of the second surface that is greater than the first stiffness to provide the third contact pressure, and wherein within the first nip region portions of the first and second surfaces at least one transverse rib interconnects each projecting rib with the second surface, and within the second nip region portions of the first and second surfaces at least one other transverse rib interconnects each projecting rib with the second surface.

9. The sealing member of claim 8, wherein the at least one transverse rib comprises two spaced apart transverse ribs respectively positioned on each side of the nip and the at least one other transverse rib comprises two spaced apart transverse ribs respectively positioned on each side of the second nip.

10. The sealing member of claim 1, wherein the at least one groove of the first surface is angled with respect to the sides of the first portion of the first surface to urge toner away from an end of the roll during roll rotation and is parallel to the sides of the nip region portion of the first surface.

11. The sealing member of claim 7, wherein the at least one groove of the first surface is angled with respect to the sides of the first portion of the first surface to urge toner away from an end of the roll during roll rotation and is parallel to the sides of the first nip region portion and second nip region portion of the first surface.

12. The sealing member of claim 11, wherein the at least one groove in the first nip region portion of the first surface comprises a plurality of parallel grooves and the at least one groove in the second nip region portion of the first surface comprises a second plurality of parallel grooves having a peak to peak spacing and a depth that is different from a peak to peak spacing and a depth of the plurality of parallel grooves in the first nip region portion.

13. The sealing member of claim 1, wherein the second contact pressure is between 1.5 to 5 times greater than the first contact pressure.

14. The sealing member of claim 13, wherein the second contact pressure is 2 times greater than the first contact pressure.

15. The sealing member of claim 7, wherein the third contact pressure is between 1.5 to 5 times greater than the first contact pressure.

16. The sealing member of claim 1, located within a printer cartridge.

17. A sealing member for sealing between a roll, a doctor blade and a flap seal component, comprising:
a first surface to be engaged with the roll, the doctor blade and the flap seal, the roll and the doctor blade and the roll and the flap seal forming respective first and second nip regions therebetween, the first surface including a plurality of grooves, a first portion of the first surface abutting and intermediate the first and second nip regions engaging with a corresponding portion of said roll at a first contact pressure and respective first and second nip region portions of said first surface respectively engaging the roll and the doctor blade and the roll and the flap seal at the first and second nip regions, respectively, at a second contact pressure and a third contact pressure, respectively; and
a second surface biasing said first surface to frictionally engage with the roll, the doctor blade and the flap seal, a first portion of the second surface providing a substantially uniform first contact pressure along the first portion of the first surface and first and second nip region portions of the second surface providing the second contact pressure and the third contact pressure along the first and second nip region portions, respectively, of the first surface, each of the second contact pressure and the third contact pressure being greater than the first contact pressure,
wherein the second surface comprises a pair of projecting ribs, each rib having a first stiffness along the first portion of the second surface to provide the first contact pressure and a second and third stiffness along the first and second nip region portions, respectively, of the second surface that are greater than the first stiffness to provide the second and third contact pressures, respectively.

18. The sealing member of claim 17, wherein a portion of each rib along the first portion of the second surface has a cross-sectional area that is less than a cross sectional area of a portion of each rib along the first and second nip region portions of the second surface.

19. The sealing member of claim 18, wherein the cross sectional area of each rib in the first nip region portion is greatest about a nip formed between the roll and the doctor blade within the first nip region and the cross sectional area of each rib in the second nip region portion is greatest about a nip formed between the roll and the flap seal within the second nip region.

20. The sealing member of claim 19, wherein the cross sectional area of each rib within the first nip region portion of the second surface gradually increases in size from the abutment of the first nip region portion of the second surface with the first portion of the second surface to a maximum size at about the nip formed between the roll and the doctor blade and the cross sectional area of each rib within the second nip region portion of the second surface gradually increases in size from the abutment of the second nip region portion of the second surface with the first portion of the second surface to a maximum size at about the nip formed between the roll and the flap seal.

21. The sealing member of claim 17, wherein the second contact pressure is between 1.5 to 5 times greater than the first contact pressure and the third contact pressure is between 1.5 to 5 times the first contact pressure.

22. The sealing member of claim 21, wherein the second contact pressure and the third contact pressure are each 2 times greater than the first contact pressure.

23. A sealing member for sealing between a roll and at least one printer component, comprising:
- a first surface to be engaged with the roll and the at least one printer component, the roll and the at least one printer component forming a nip region therebetween, the first surface including at least one groove, a first portion of the first surface engaging with a corresponding portion of the roll at a first contact pressure and a nip region portion of the first surface abutting an end of the first portion of the first surface and engaging the roll and the at least one printer component along said nip region at a second contact pressure; and
- a second surface biasing the first surface to engage with the roll and the at least one printer component, a first portion of the second surface providing the first contact pressure in a substantially uniform manner along the first portion of the first surface, and a nip region portion of the second surface providing the second contact pressure along the nip region portion of the first surface that is greater than the first contact pressure,
- wherein the first surface is further to be engaged with the roll and a second printer component, the roll and the second printer component forming a second nip region therebetween, a second nip region portion of said first surface abutting a second end of the first portion of the first surface and engaging the roll and the second printer component along the second nip region at a third contact pressure, and
- wherein the second surface further biases the first surface to engage with the roll and the second printer component, a second nip region portion of the second surface providing the third contact pressure along the second nip region portion of the first surface that is greater than the first contact pressure.

24. The sealing member of claim 23, wherein the second surface includes a pair of projecting ribs, each rib having a first stiffness along the first portion of the second surface to provide the first contact pressure, a second stiffness along the first nip region portion of the second surface that is greater than the first stiffness to provide the second contact pressure and a third stiffness along the second nip region portion of the second surface that is greater than the first stiffness to provide the third contact pressure, and wherein within the first nip region portions of the first and second surfaces at least one transverse rib interconnects each projecting rib with the second surface, and within the second nip region portions of the first and second surfaces at least one other transverse rib interconnects each projecting rib with the second surface.

25. The sealing member of claim 24, wherein the at least one transverse rib comprises two spaced apart transverse ribs respectively positioned on each side of the nip and the at least one other transverse rib comprises two spaced apart transverse ribs respectively positioned on each side of the second nip.

26. A sealing member for sealing between a roll and at least one printer component, comprising:
- a first surface to be engaged with the roll and the at least one printer component, the roll and the at least one printer component forming a nip region therebetween, the first surface including at least one groove, a first portion of the first surface engaging with a corresponding portion of the roll at a first contact pressure and a nip region portion of the first surface abutting an end of the first portion of the first surface and engaging the roll and the at least one printer component along said nip region at a second contact pressure; and
- a second surface biasing the first surface to engage with the roll and the at least one printer component, a first portion of the second surface providing the first contact pressure in a substantially uniform manner along the first portion of the first surface, and a nip region portion of the second surface providing the second contact pressure along the nip region portion of the first surface that is greater than the first contact pressure,
- wherein the second contact pressure is between 1.5 to 5 times greater than the first contact pressure.

27. A sealing member for sealing between a roll, a doctor blade and a flap seal component, comprising:
- a first surface to be engaged with the roll, the doctor blade and the flap seal, the roll and the doctor blade and the roll and the flap seal forming respective first and second nip regions therebetween, the first surface including a plurality of grooves, a first portion of the first surface abutting and intermediate the first and second nip regions engaging with a corresponding portion of said roll at a first contact pressure and respective first and second nip region portions of said first surface respectively engaging the roll and the doctor blade and the roll and the flap seal at the first and second nip regions, respectively, at a second contact pressure and a third contact pressure, respectively; and
- a second surface biasing said first surface to frictionally engage with the roll, the doctor blade and the flap seal, a first portion of the second surface providing a substantially uniform first contact pressure along the first portion of the first surface and first and second nip region portions of the second surface providing the second contact pressure and the third contact pressure along the first and second nip region portions, respectively, of the first surface, each of the second contact pressure and the third contact pressure being greater than the first contact pressure,
- wherein the second contact pressure is between 1.5 to 5 times greater than the first contact pressure and the third contact pressure is between 1.5 to 5 times the first contact pressure.

* * * * *